(12) United States Patent
Greenberg et al.

(10) Patent No.: US 12,500,779 B2
(45) Date of Patent: Dec. 16, 2025

(54) SECURE COMMUNICATION BETWEEN A SOURCE TO MULTIPLE TARGETS

(71) Applicant: Mobileye Vision Technologies Ltd., Jerusalem (IL)

(72) Inventors: Anna Greenberg, Maale Adumim (IL); Aviad Kipnis, Efrat (IL); Alexander Brill, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 126 days.

(21) Appl. No.: 18/442,763

(22) Filed: Feb. 15, 2024

(65) Prior Publication Data

US 2024/0275616 A1 Aug. 15, 2024

Related U.S. Application Data (60) Provisional application No. 63/484,169, filed on Feb. 9, 2023.

(51) Int. Cl.
*H04L 29/06* (2006.01)
*H04L 9/08* (2006.01)
*H04L 9/32* (2006.01)

(52) U.S. Cl.
CPC .......... *H04L 9/3271* (2013.01); *H04L 9/0825* (2013.01); *H04L 9/0861* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 2012/0036368 A1* | 2/2012 | Spalka | H04L 9/0866 713/182 |
| 2017/0070882 A1* | 3/2017 | Rosa | H04L 9/14 |

\* cited by examiner

*Primary Examiner* — Andrew J Steinle
(74) *Attorney, Agent, or Firm* — Schwegman Lundberg & Woessner, P.A.

(57) ABSTRACT

A method for secure communication, the method includes (a) receiving, by a first entity executable by a first circuit, challenges of second entities, the second entities are executable by second circuits; (b) generating a pair of asymmetrical keys, the pair includes a new public key and a new private key; (c) generating a response message that includes a representation of the challenges of the second entities and the new public key, wherein the response message is signed by the first entity; (d) sending the response message to the second entities; (e) for each second entity (e.1) determining a unique symmetrical key associated with the second entity; wherein the determining is based on the new private key and a verified public key of the second entity; and (e.2) securely communicating with the second entity using the unique symmetrical key associated with the second entity.

12 Claims, 5 Drawing Sheets

SECURE COMMUNICATION BETWEEN A SOURCE TO MULTIPLE TARGETS

CLAIM OF PRIORITY

This application claims the benefit of priority to U.S. Provisional Patent Application No. 63/484,169, filed Feb. 9, 2023, which is incorporated herein by reference in its entirety.

BACKGROUND

Advanced driver assistance systems (ADAS), and autonomous vehicle (AV) systems use multiple sensors for sensing an environment of a vehicle.

The cameras may store sensitive information—such as information that can be used for tracking after the vehicle, or any other environmental information that should not be distributed in an unsecure manner.

A processer may be configured to communicate with the cameras in order to obtain sensed information regarding the environment.

Third parties that are not authorized to access the sensed information may attempt to access the sensed information.

In order to protect the sensed information, the processor has to establish a secure communication session with each one of the sensors. This is done by independently establishing, by the processor, a secure communication session with each one of the sensors.

The independent establishment, by the processor, of the multiple secure communication session is resource consuming—and the consumption increases with the number of sensors.

There is a growing need to simplify the establishment of secure communication sessions.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

There are provided systems, methods, as illustrated in the claims and the specification.

Any combination of any subject matter of any claim may be provided.

Any combination of any method and/or method step disclosed in any figure and/or in the specification may be provided.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

There is provided solution for a fast and efficient key exchange between a first entity and a multiple second entities, while establishing a unique secure session between the first entity and each second entity of multiple second entities. The multiple second entities are a first number (N) of second entities, N is an integer that exceeds two. For example—N may exceed 2, 5, 8, 10, 15, 20 and the like.

According to an embodiment, the first entity is a logical entity configured to communicate with any one of the second entities which are logic entities configured to communicate with the first entity. According to an embodiment, each logical entity is implemented by circuit. According to an embodiment, the implementing of a logical entity includes executing instructions and/or executing code and/or executing software and/or executing firmware by the circuit. The circuit is a hardware circuit such as a processing circuit.

According to an embodiment, the first entity and the multiple entities are endpoints. For example—the endpoints are Security Protocol and Data Model (SPDM) compliant endpoints—for example SPDM version 1.3.0 (or any earlier version) compliant endpoints.

According to an embodiment, the first entity is a requestor and the multiple second entities are responders.

According to an embodiment, the requestor is a SPDM compliant requestor and the responders are SPDM compliant responders.

According to an embodiment the requestor and the responders are not SPDM compliant. Secure communication schemes other than SPDM may be used.

Instead of participating, by the first entity, in a multiple separate asymmetrical key authentication processes—one for each second entity, the first entity participates in a single asymmetrical key authentication process in which the first entity receives messages from the multiple second entities, generates a response message that includes content aimed to multiple second entities, and transmits the response message to the multiple second entities.

The participation of the first entity in a single asymmetrical key authentication process is highly effective and dramatically reduces the computational resources and/or memory resources and/or transmission resources required for implementing the single asymmetrical key authentication process—in comparison to a participation of the first entity in N separate asymmetrical key authentication processes—one for each second entity. The reduction increased with an increase with the value of the first number.

According to an embodiment, the resource reduction is exemplified by reducing the need to synchronize between at least N messages sent to the multiple second entities, reduction of efforts allocated to tracking after N different asymmetrical key authentication process, having the first entity generate a response message instead of N different response messages, and the like. In addition—fewer messages require less bandwidth.

According to embodiment, a successful completion of the single asymmetrical key authentication process is followed by generations of unique symmetric keys—one exchange per each pair of the first entity and a second entity of the multiple second entities.

According to embodiment, a successful completion of the generation of the unique symmetric keys allows the first entity to conduct a secure session with each second entity of the multiple second entities.

According to embodiment, the first entity may received content from each secure entity—using the secure session established with the second entity.

Figure 1:
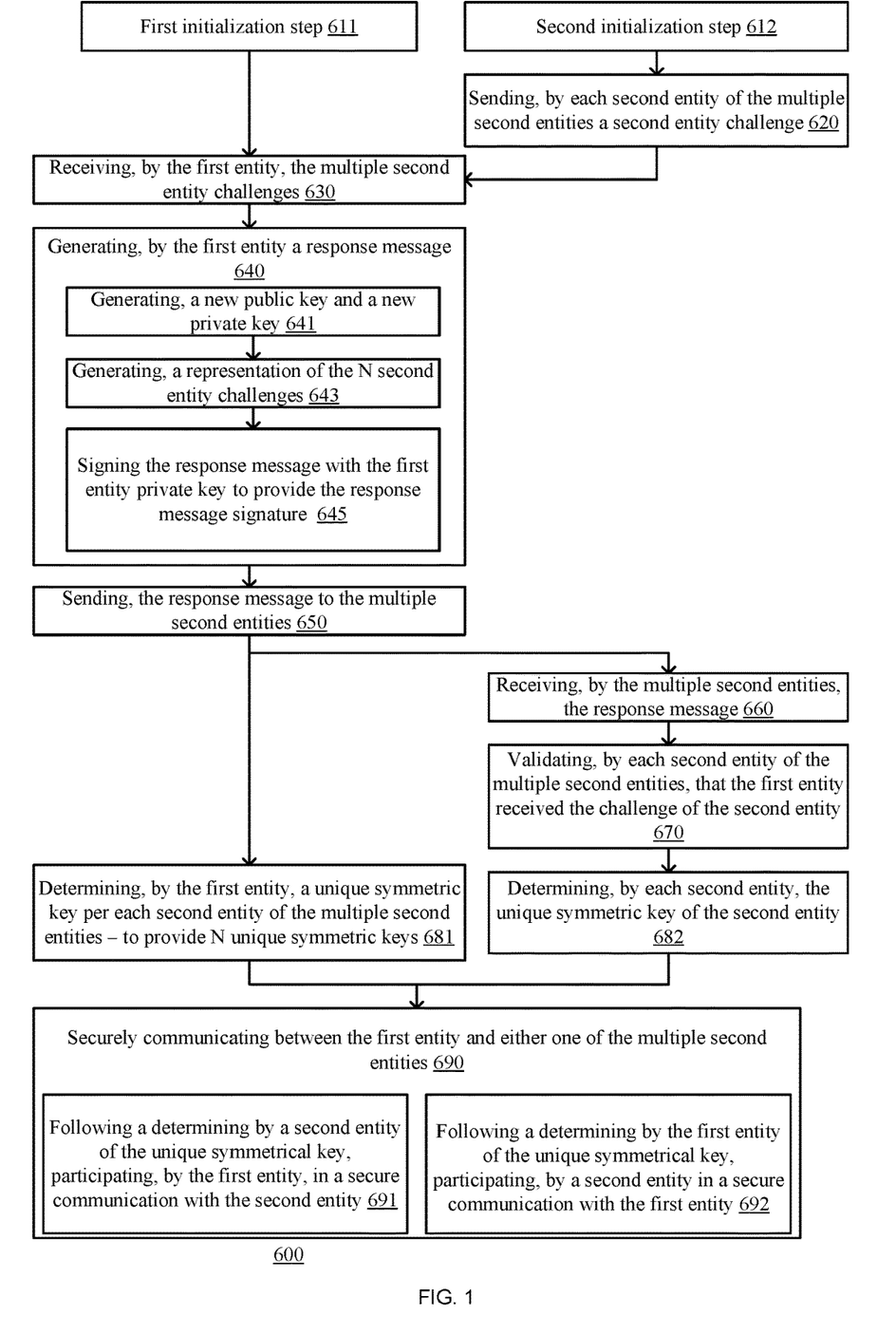
FIG. 1 illustrates an example of a method.

FIG. 1 illustrates an example of method 600 for performing a key exchange between a first entity and multiple second entities.

According to an embodiment, method 600 starts with a first initialization step 611 and by a second initialization step 612.

According to an embodiment, the first initialization step 611 includes obtaining, by the first entity, authenticated public keys of each one of the multiple second entities. Assuming that there are N second entities and that index n ranges between 1 to N, an authenticated public key of the n'th second entity is denoted AuthPubKeySE(n). There are N authenticated public key denoted AuthPubKeySE(1)-AuthPubKeySE(N).

According to an embodiment, the second initialization step 612 includes obtaining, by each second entity, an authenticated public key of the first entity—denoted AuthPubKeyFE.

Initialization steps 611 and 612 may be executed once per multiple iterations of other steps of method 600.

According to an embodiment, the first and second initialization steps are followed by step 620 of sending, by each second entity of the multiple second entities a second entity challenge to the first entity to provide multiple second entity challenges. A second entity challenge of the n'th second entity is denoted ChallengeSE(n). There are N second entity challenges denoted ChallengeSE(1)-ChallengeSE(N).

According to an embodiment, the second entity is triggered to send a second entity challenge following a reception of a request to provide information. A third party that may have recorded a previous exchange of information between the second entity and the first entity may request information, using the recording, and method 600 safeguards the second entity from such requests.

Different second entities send different second entity challenges. According to an embodiment, the second entity challenges are random numbers. It should be noted that any other process of generating second entity challenges that differ from each other may be used.

According to an embodiment the second entities do not interact with each other are not aware of cryptographic information (such as public keys) of other second entities.

According to an embodiment, step 620 is followed by step 630 of receiving, by the first entity, the multiple second entity challenges.

According to an embodiment, step 630 is followed by step 640 of generating, by the first entity a response message. The response message is denoted RespMess.

According to an embodiment, step 640 includes:
a. Step 641 of generating a new public key (denoted—PubKeyNew) and a new private key (denoted—PrivKeyNew). According to an embodiment, the new public key is included in the response message.
b. Step 643 of generating a representation of the N second entity challenges denoted ChallengeSE(1)-ChallengeSE(N). The representation is denoted RepChallangeSE(1-N). The representation is constructed in a manner that each second entity (of the multiple second entities) is capable to determine whether the first entity received the challenge of the second entity.
c. Step 645 of generating a response message signature (Denoted ResSign) using the first entity private key (PrivKeyFE).
d. Step 647 of signing the response message with the response message signature (ResSign 708). The response message signature may be include in the response message or may not be included in the response message.

According to an embodiment, step 640 is followed by step 650 of sending the response message to the multiple second entities.

According to an embodiment, step 650 is followed by step 660 of receiving, by the multiple second entities, the response message.

According to an embodiment, step 660 is followed by step 670 of validating, by each second entity of the multiple second entities, that the first entity received the challenge of the second entity.

According to an embodiment, the validation includes:
a. Validating the response message signature using the authenticated first entity public key (AuthPubKeyFE).
b. Checking that the representation (RepChallangeSE(1-N)) is indicative of a reception of the second entity challenge.

According to an embodiment, when all multiple second entities successfully validated that the first entity received their challenges, 670 is followed by steps 681 and 682.

According to an embodiment, step 681 includes determining, by the first entity, a unique symmetric key per each second entity of the multiple second entities—to provide N unique symmetric keys.

According to an embodiment, a unique symmetric key used in association with the n'th second entity (UniSymmKey(n))—is calculated by the first entity based on the new private key (PrivKeyNew) and the authenticated public key of the n'th second entity (AuthPubKeySE(n)).

According to an embodiment, step 682 includes determining, by each second entity, the unique symmetric key of the second entity. The multiple second entities determine the N unique symmetric keys.

According to an embodiment, for the unique symmetric key used by the n'th second entity ((UniSymmKey(n))—is calculated based on the new public key (PubKeyNew) and the private key of the second entity (PrivKeySE(n)).

Upon a completion of steps 681 and 682—the first entity and each one of the N second entities are capable of conducting a secure session.

According to an embodiment, steps 681 and 682 are followed by step 690 of securely communicating between the first entity and either one of the multiple second entities.

According to an embodiment, step 690 includes step 691 of—following a determining by a second entity of the unique symmetrical key, participating, by the first entity, in a securely communication with the second entity.

According to an embodiment, step 690 includes 692 of—following a determining by the first entity of the unique symmetrical key, participating, by a second entity in a securely communication with the first entity.

Figure 2:
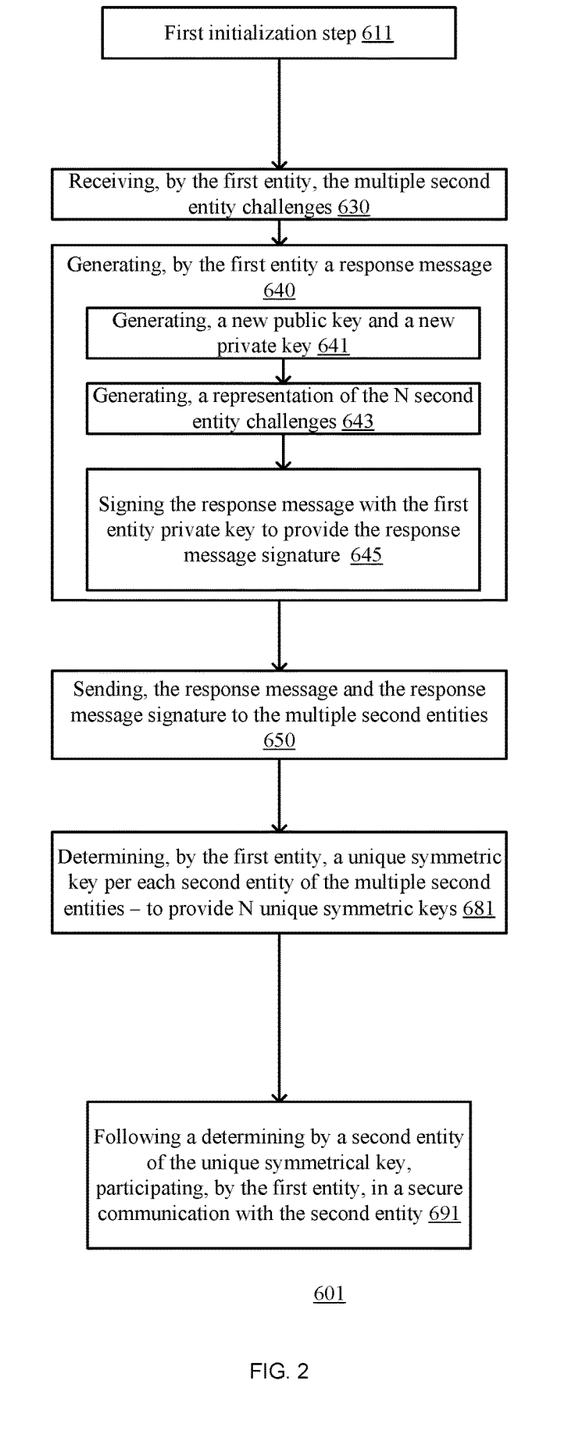
FIG. 2 illustrates an example of a method.

FIG. 2 is an example of method 601 that represents steps executed by the first entity in relation to the performing of the key exchange between the first entity and the multiple second entities.

The successful completion of method 601 is conditioned by having the multiple second entities successfully complete their part—as illustrated in method 600—especially the successful completion of second initialization step 612, and steps 620, 660, 670, 682 and step 691.

According to an embodiment, method 601 starts by first initialization step 611.

According to an embodiment, first initialization step 611 is followed by step 630 of receiving, by the first entity, the multiple second entity challenges.

According to an embodiment, step 630 is followed by step 640 of generating, by the first entity a response message.

According to an embodiment, step 640 is followed by step 650 of sending the response message to the multiple second entities.

According to an embodiment, step 650 is followed by step 681 of determining, by the first entity, a unique symmetric key per each second entity of the multiple second entities—to provide N unique symmetric keys.

According to an embodiment, step 681 is followed by step 691. Step 691 is executed following a determining by each second entity of the unique symmetrical key. Step 691 includes participating, by the first entity, in a secure communication with either one of the multiple second entities.

Figure 3:
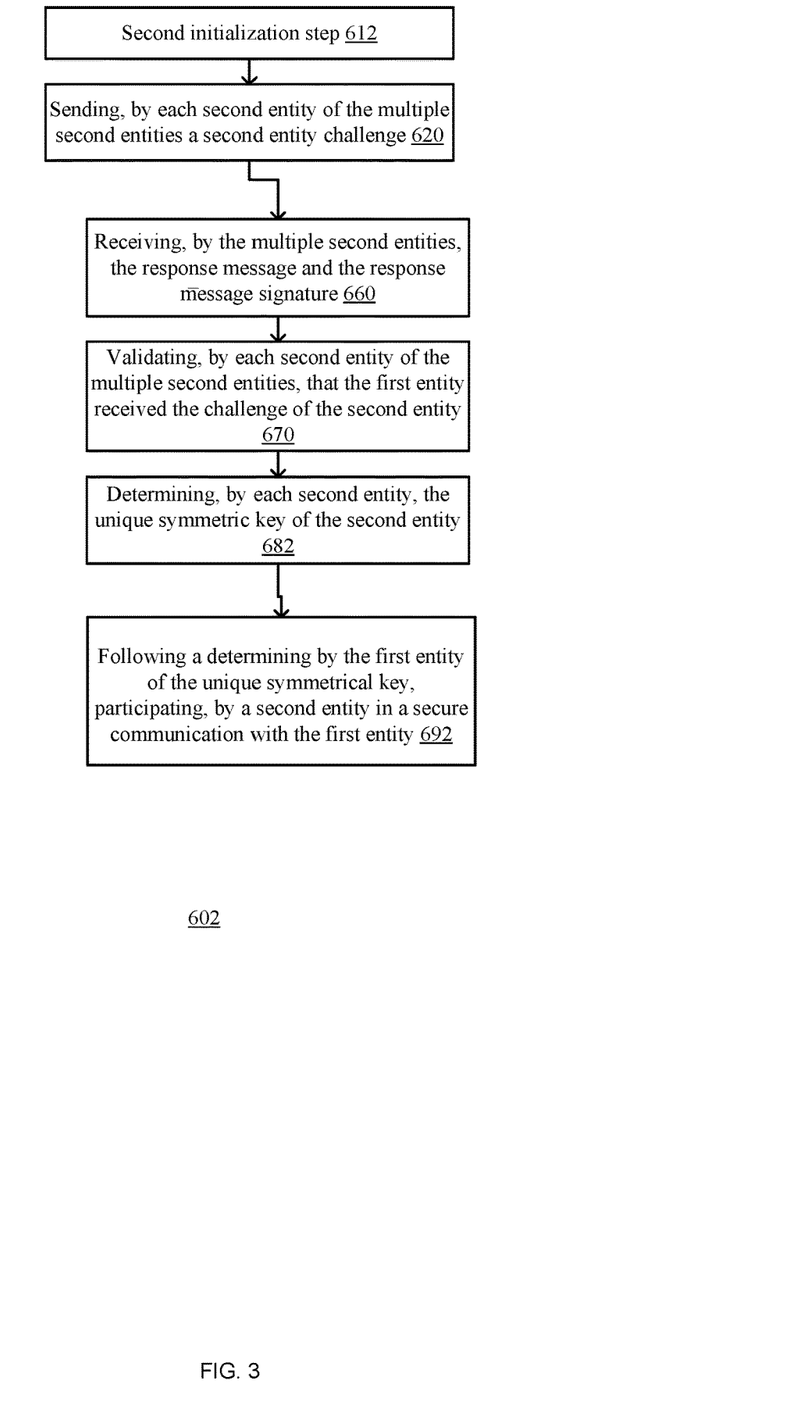
FIG. 3 illustrates an example of a method.

FIG. 3 is an example of method 602 that represents steps executed by the multiple second entities in relation to the performing of the key exchange between the first entity and the multiple second entities.

The successful completion of method 602 is conditioned by having the first entity successfully complete its part—as illustrated in method 600—especially the successful completion of first initialization step 611, and steps 630, 640, 650, 681 and the participation in step 690.

According to an embodiment, method 602 starts by second initialization step 612.

According to an embodiment, second initialization step 612 is followed by step 620 of sending, by each second entity of the multiple second entities a second entity challenge to the first entity to provide multiple second entity challenges.

According to an embodiment, step 620 is followed by step 660 of receiving, by the multiple second entities, the response message.

According to an embodiment, step 660 is followed by step 670 of validating, by each second entity of the multiple second entities, that the first entity received the challenge of the second entity.

According to an embodiment, step 670 is followed by step 682 of determining, by each second entity, the unique symmetric key of the second entity. The multiple second entities determine the N unique symmetric keys According to an embodiment, step 682 is followed by step 692. Step 692 is executed following a determining, by the first entity, of a unique symmetric key per each second entity of the multiple second entities. Step 692 includes participating, by either one of the multiple second entities, in a secure communication with the first entity.

Figure 4:
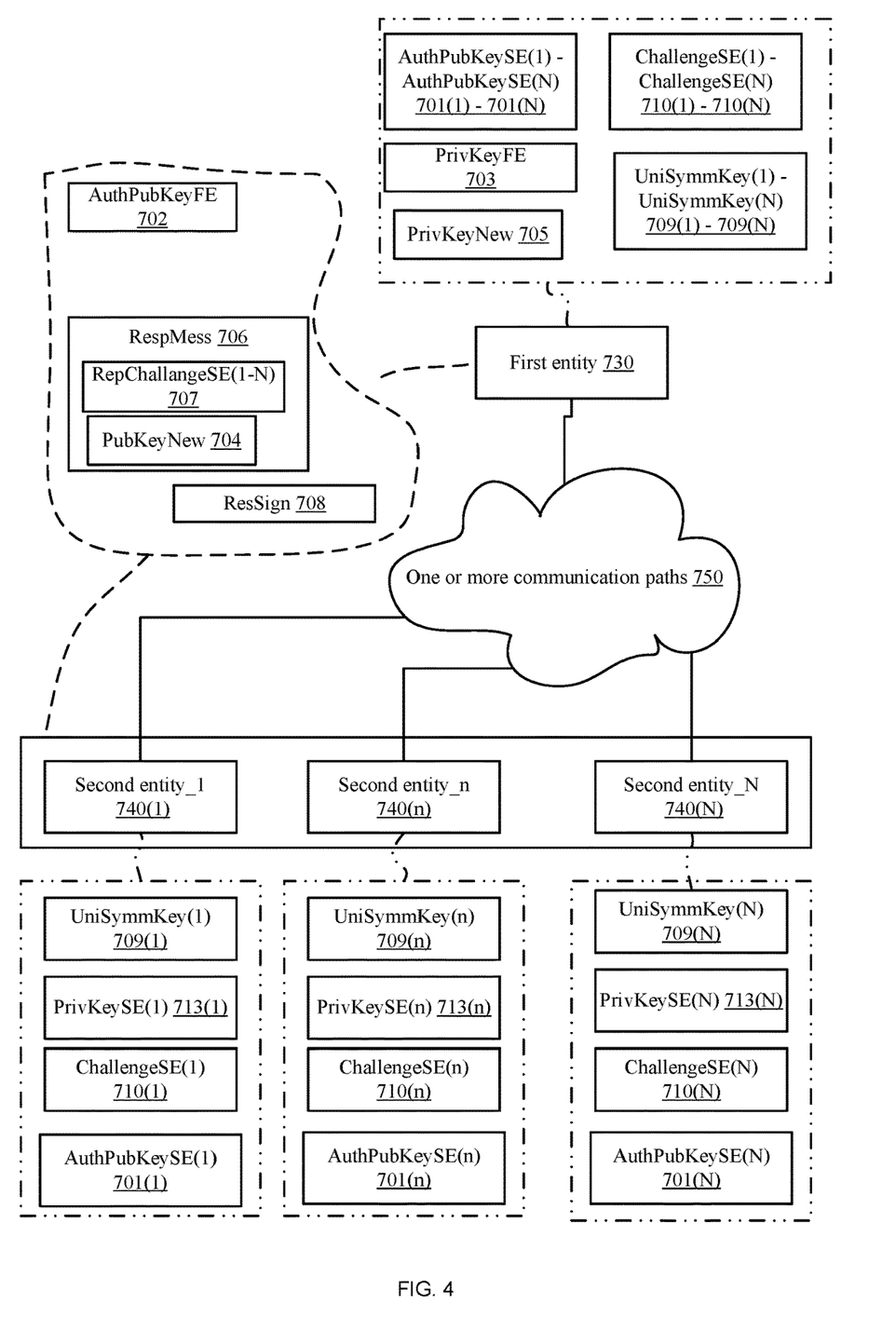
FIG. 4 illustrates an example of a system.

FIG. 4 illustrates an example of first entity 730, multiple second entities 740(1)-740(N), one or more communication paths 750, and various information and/or messages.

First entity 730 has access to:
 a. AuthPubKeySE(1)-AuthPubKeySE(N) 701(1)-701(N).
 b. PrivKeyFE 703.
 c. PrivKeyNew 705.
 d. ChallengeSE(1)-ChallengeSE(N) 710(1)-710(N).
 e. UniSymmKey(1)-UniSymmKey(N) 709(1)-709(N).

Each second entity (for example the n'th second entity) has access to:
 a. UniSymmKey(n) 709(n).
 b. PrivKeySE(n) 713(n).
 c. ChallengeSE(n) 710(n).
 d. AuthPubKeySE(n) 701(n).

The first entity 730 and each one of the second entities have access to:
 a. AuthPubKeyFE 702.
 b. RespMess 706 (including RepChallangeSE(1-N) 707 and PubKeyNew 704.
 c. ResSign 708. May be a part of the RespMess.

FIG. 4 also illustrates that second_entity(1) 740(1) has access to UniSymmKey(1) 709(1), PrivKeySE(1) 713(1), ChallengeSE(1) 710(1), and AuthPubKeySE(1) 701(1).

FIG. 4 also illustrates that second_entity(N) 740(N) has access to UniSymmKey(N) 709(N), PrivKeySE(N) 713(N), ChallengeSE(N) 710(N), and AuthPubKeySE(N) 701(N).

Figure 5:
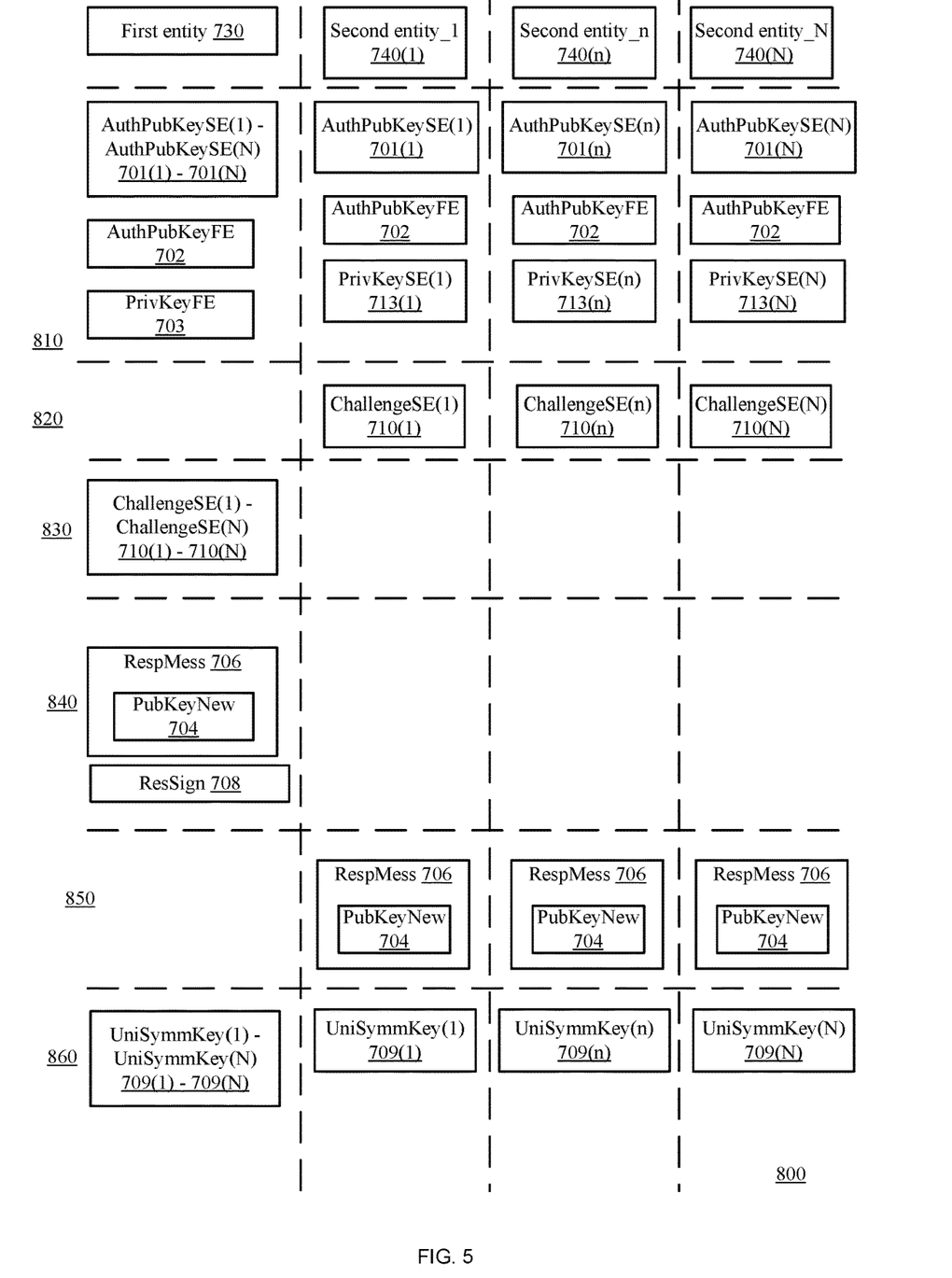
FIG. 5 illustrates an example of a time diagram.

FIG. 5 and illustrate the information and message accessible to the first entity and the second entities during different phases of execution of method 600.

Phase 810 (step 611)—FE 730 has access to:
 a. AuthPubKeySE(1)-AuthPubKeySE(N) 701(1)-701(N).
 b. PrivKeyFE 703.
 c. PrivKeyNew 705.

Phase 820 (step 612): SE(n) 740(n) has access to:
 a. AuthPubKeyFE 702.
 b. PrivKeySE(n) 713(n).
 c. AuthPubKeySE(n) 701(n).

Phase 830 (step 620): SE(n) has access to ChallangeSE(n) 710(n).

Phase 840 (step 630)—FE has access to ChallangeSE(1)-Challenge SE(N)—710(1)-710(N).

Phase 840 (steps 640, 650)—FE has access to RespMess 706 (includes PubKeyNew) 740) and ResSign 708.

Phase 850 (step 660)—SE(n) has access to RespMess 706 (includes PubKeyNew) 740) and ResSign 708 (the latter is not shown for simplicity of explanation).

Phase 860 (steps 861 and 862)—FE has access to UniSymmKey(1)-UniSymmKey(N) 709(1)-709(N) and SE(n) has access to UniSymmKey(n).

FIG. 5 also illustrates the message and information accessible to SE(1) and SE(N).

Any reference to any of the terms "comprise", "comprises", "comprising" "including", "may include" and "includes" may be applied to any of the terms "consists", "consisting", "and consisting essentially of". For example—any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for secure communication, the method comprises:
   receiving, by a first entity executable by a first circuit, challenges of second entities, the second entities are executable by second circuits;
   generating, by the first entity, a pair of asymmetrical keys, the pair comprises a new public key and a new private key;
   generating, by the first entity, a response message that comprises a representation of the challenges of the second entities and the new public key, wherein the response message is signed by the first entity;
   sending the response message to the second entities;
   for each second entity:
      determining by the first entity, a unique symmetrical key associated with the second entity; wherein the determining is based on the new private key and a verified public key of the second entity; and
      securely communicating with the second entity using the unique symmetrical key associated with the second entity.

2. The method according to claim 1, wherein the representation of the challenges of the second entities is a concatenation of the challenges of the second entities.

3. The method according to claim 1, comprising preventing access to the new private key from each second entity of the second entities.

4. The method according to claim 1, wherein the second entities are endpoints.

5. The method according to claim 1, wherein the second entities are Security Protocol and Data Model compliant endpoints.

6. The method according to claim 1, comprising independently communicating with different second entities.

7. The method according to claim 1, wherein the first entity is a processor and the second entities are sensors having computing capabilities.

8. The method according to claim 1, wherein the challenges of the second entities are random numbers generated independently by the second entities.

9. The method according to claim 1, further comprising generating by the second entities the challenges of the second entities.

10. The method according to claim 1, further comprising determining, by each second entity, the unique symmetrical key associated with the second entity, based on the new public key and a verified public key of the first entity.

11. A non-transitory computer readable medium for secure communication, the non-transitory computer readable medium stores instructions for:
   receiving, by a first entity hosted by a first circuit, challenges of second entities, the second entities are hosted by second circuits;
   generating, by the first entity, a pair of asymmetrical keys, the pair comprises a new public key and a new private key;
   generating, by the first entity, a response message that comprises a representation of the challenges of the second entities and the new public key, wherein the response message is signed by the first entity;
   sending the response message to the second entities;
   for each second entity:
      determining by the first entity, a unique symmetrical key associated with the second entity; wherein the determining is based on the new private key and a verified public key of the second entity; and
      securely communicating with the second entity using the unique symmetrical key associated with the second entity.

12. A device for secure communication, the device comprises:
   a first circuit configured to host a first entity that is configured to:
      receive challenges of second entities, the second entities are hosted by second circuits;
      generate a pair of asymmetrical keys, the pair comprises a new public key and a new private key;
      generate a response message that comprises a representation of the challenges of the second entities and the new public key, wherein the response message is signed by the first entity;
      send the response message to the second entities;
      wherein for each second entity:
         the first entity is configured to determine a unique symmetrical key associated with the second entity; wherein the determining is based on the new private key and a verified public key of the second entity; and
         the first entity is configured to securely communicate with the second entity using the unique symmetrical key associated with the second entity.

* * * * *